United States Patent [19]

Ronzio et al.

[11] 3,829,550

[45] Aug. 13, 1974

[54] PROCESS FOR MAKING HIGH PURITY MOLYBDENUM OXIDE AND AMMONIUM MOLYBDATE

[75] Inventors: Richard A. Ronzio, Golden; John W. Lane, Lakewood; John D. Vincent, Golden, all of Colo.

[73] Assignee: American Metal Climax, Inc., New York, N.Y.

[22] Filed: Sept. 25, 1972

[21] Appl. No.: 291,922

[52] U.S. Cl.......................... 423/54, 423/55, 423/56, 423/58
[51] Int. Cl........................................... C01g 41/00
[58] Field of Search ..................... 423/56, 54, 58, 55

[56] References Cited
UNITED STATES PATENTS

| | | | |
|---|---|---|---|
| 2,096,846 | 10/1937 | Donahue et al. | 423/58 |
| 3,196,004 | 7/1965 | Kunda | 423/56 X |
| 3,357,821 | 12/1967 | Hemickson | 423/58 X |
| 3,455,677 | 7/1969 | Litz | 423/56 X |
| 3,739,057 | 6/1973 | Daugherty et al. | 423/56 X |

*Primary Examiner*—Herbert T. Carter
*Attorney, Agent, or Firm*—Harness, Dickey & Pierce

[57] ABSTRACT

A process for producing a high grade molybdenum trioxide and/or ammonium molybdate product whereby an oxidized molybdenite concentrate is subjected to an ammonium hydroxide leaching step including a digestion phase in which an oxidation of some of the impurities therein, particularly iron, is effected, resulting in a coprecipitation of iron and aluminum hydroxide, together with other impurities including lead, bismuth, tin, arsenic, phosphorous, soluble silica, and the like. The resultant aqueous solution containing ammonium molybdate is filtered and thereafter crystallized, followed by calcining to produce a high purity molybdenum trioxide product. It is also contemplated that all or a portion of the molybdenum trioxide product derived from the calciner can be subjected to a second phase purification operation in which the molybdenum trioxide is digested with a dilute nitric acid solution to effect a further leaching or residual contaminating constituents, whereafter the molybdenum oxide value is redissolved in an aqueous ammonium hydroxide solution which is filtered and subsequently crystallized to produce a high purity ammonium molybdate product.

7 Claims, 3 Drawing Figures

PROCESS FOR MAKING HIGH PURITY MOLYBDENUM OXIDE AND AMMONIUM MOLYBDATE

BACKGROUND OF THE INVENTION

A variety of processes have heretofore been used or proposed for refining molybdenite concentrate and roasted concentrates of molybdenite to extract various naturally-occurring contaminating constituents which are detrimental in many of the end uses of the final molybdenum oxide product. One method heretofore used is to sublime a roasted molybdenite concentrate at high temperature, such as 1000°C. or higher, and thereafter dissolve the condensed molybdenum oxide product recovered with an aqueous ammonia solution to produce ammonium molybdate. The ammonium molybdate compound produced thereafter is calcined and a high purity molybdenum oxide product is recovered. Unfortunately, the yield of such processes is relatively poor based on the molybdenum content present in the starting feed material, which necessitates a further processing of the residue to recover the residual molybdenum values therein, which detracts from the overall economics of the refining process.

It has also been suggested to subject concentrates of molybdenite to selective leaching operations, wherein selected ones or combinations of the contaminating constituents, such as lead, bismuth, copper and/or zinc, are selectively removed, yielding a product of comparatively high purity. Selective leaching processes of the foregoing type, while effective to remove the predominant proportion of some of the contaminating elements present in molybdenum oxide concentrates, are usually ineffective to remove substantially all of each of the variety of contaminating constituents present in the feed material unless relatively tedious and time-consuming plural leaching operations are performed. Such plural leaching operations are usually accompanied by a progressive reduction in the total yield of molybdenum products recovered, which further detracts from the economics of the refining process.

The process comprising the present invention overcomes the problems and disadvantages associated with prior art techniques enabling the production of a substantially high purity molybdenum oxide product which can be further refined in a second stage operation to produce a still higher purity ammonium molybdate product in comparatively high yields and at commercially acceptable costs.

SUMMARY OF THE INVENTION

The benefits and advantages of the present invention are achieved by a process in which a molybdenite concentrate is subjected to oxidation, such as by a roasting in the presence of excess air, to convert the predominant portion of the molybdenum disulfide content thereof to the corresponding molybdenum trioxide state. The concentrate, if of an average particle size greater than about 200 mesh, is preferably subjected to further pulverization to reduce the particle size thereof and increase the surface area of the feed material to enhance the subsequent reactions involved in the refining process. The resultant pulverized and oxidized concentrate is leached with an aqueous deionized water solution containing ammonium hydroxide to effect a dissolving of the predominant portion of the molybdenum oxide constituent therein, whereafter the aqueous ammoniacal slurry is digested for a period of time and under oxidizing conditions to effect an oxidation of any lower valence molybdenum present to the hexavalent state, as well as an oxidation of the ferrous iron present in the solution to the ferric state, and to effect a precipitation of ferric hydroxide and aluminum hydroxide, if present, accompanied by a concurrent precipitation of other soluble impurities present, including lead, bismuth, tin, silica, phosphorous and arsenic. The resultant digested aqueous solution is filtered and the filtrate is subjected to evaporation and crystallization, whereafter the crystals are calcined at an elevated temperature, producing a high grade molybdenum trioxide product. The filter cake is subjected to a further leaching operation employing a caustic or acid reagent or is subjected to a reroasting, followed by a leaching step employing an ammonium hydroxide solution to extract the residual molybdenum values therefrom and the residual cake is discharged to tailing. If the latter reroasting and leaching procedure is utilized, the filtrate recovered can be directly combined with the initial filtrate for evaporation and crystallization. If, on the other hand, the acid or caustic solubilizing procedure is utilized, a pH adjustment of the filtrate is made, enabling extraction of the molybdenum values either by using a suitable solvent or by using an adsorptive material, such as activated charcoal, which subsequently is stripped by using an aqueous ammonium hydroxide solution which is returned to the evaporator for crystallization along with the initial filtrate and the solvent or adsorptive material recycled.

In accordance with a further embodiment of the present invention, the molybdenum trioxide product produced from the calciner is subjected to further digestion in an aqueous solution containing dilute nitric acid. The resultant slurry is filtered and the cake can either be washed and dried and the product marketed as such or, if the concentration of the residual impurities must be lowered further, then the cake is treated with an aqueous ammoniacal solution and digested for a period of time sufficient to effect a dissolving of substantially all of the molybdenum values therein. The digested solution is again filtered and the clear filtrate is transferred to an evaporator for crystallization for producing a high purity ammonium molybdate product. A portion of the filter cake derived from the filtration step may be returned to the digester, if desired, while the balance thereof is bled to waste. The filtrate from the first filtration step of the second refining stage is preferably recycled to the effluent from the leaching filter of the first refining stage, whereby the pH is adjusted to about 1.0 and passed through an adsorption column or through a solvent extraction operation for selective extraction of the dissolved molybdenum values therein.

Still further advantages and benefits of the present invention will become apparent upon a reading of the description of the preferred embodiments, taken in conjunction with the accompanying drawings.

DESCRIPTION OF THE PREFERRED EMBODIMENTS

Figure 1:
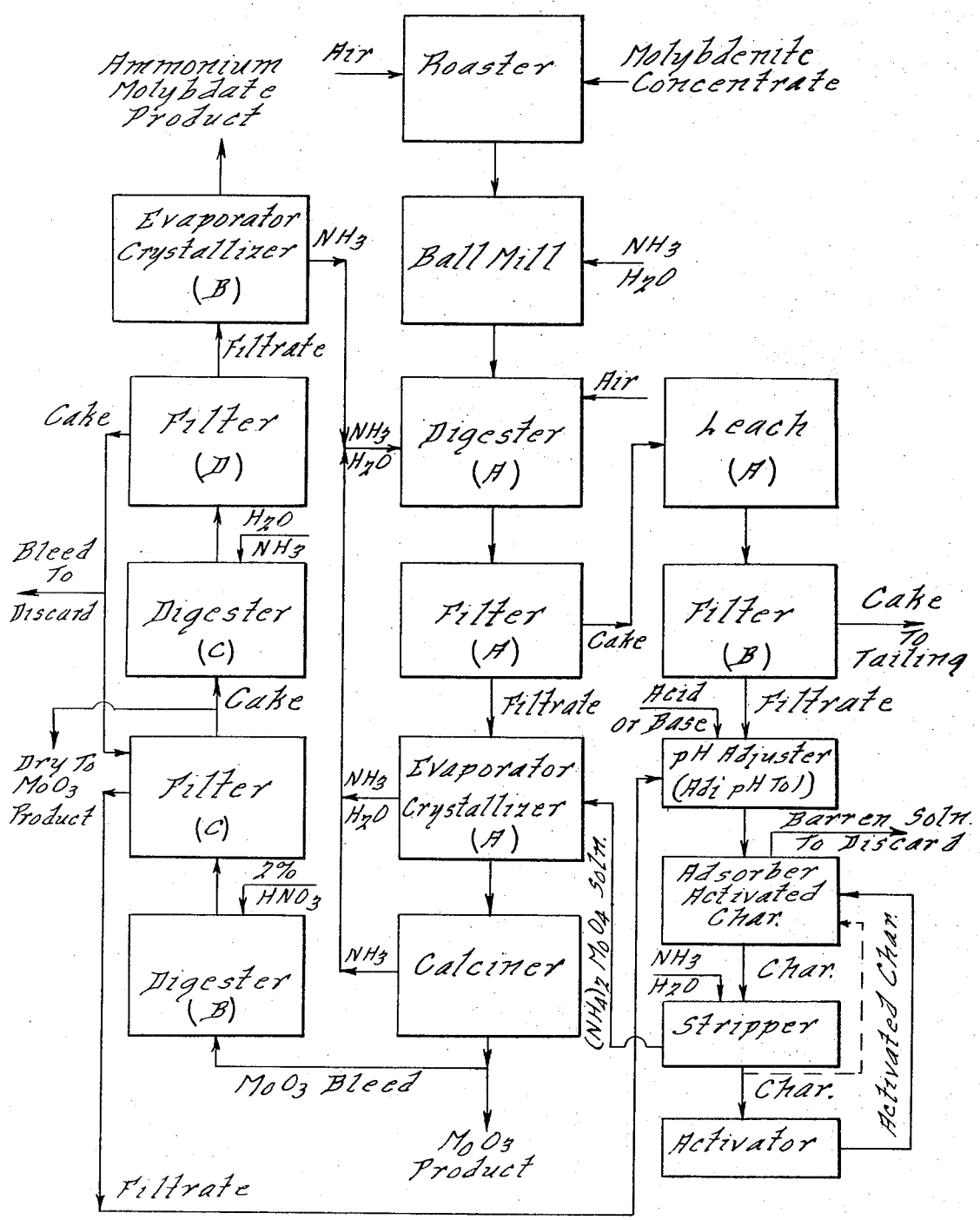
FIG. 1 comprises a schematic flow diagram of the important steps of the first and second stage refining process for producing the molybdenum trioxide and ammonium molybdate products, respectively, in accordance with one embodiment of the present invention.

In accordance with the flow sheet shown in FIG. 1 of the drawings, a molybdenite concentrate is charged to a roaster or other oxidizing apparatus in which the molybdenite ($MoS_2$) is converted to molybdenum oxide, of which a predominant proportion thereof comprises molybdenum trioxide ($MoO_3$). The molybdenite concentrate itself is derived from any one of a variety of known ore beneficiation processes to effect a concentration of the molybdenum constituent therein to a level of usually greater than about 50 percent by weight. The molybdenum disulfide concentration in molybdenite ores is usually of a magnitude of only about 0.5 percent by weight, with the remainder comprised predominantly of altered and highly silicified granite. The molybdenum disulfide constituent is present in the ores in the form of very fine veinlets and is in the form of relatively soft, hexagonal, black flaky crystals.

Perhaps the most common beneficiation process comprises the subjection of a molybdenite containing ore to a grinding operation in which the ore is reduced to particles of an average size less than about 200 mesh and whereafter the pulverized ore is subjected to oil flotation extraction operations employing hydrocarbon oil and pine oil in combination with various wetting agents. In accordance with this process, the particles, which are comprised predominantly of molybdenum disulfide, are retained in the flotation froth; while the gangue materials, which are comprised predominantly of silica, remain in the tailing portion of the pulp. The flotation beneficiation process usually involves a series of successive flotation extraction operations, each including an intervening grinding operation whereby the residual gangue constituents in the concentrate are reduced to a level usually less than about 10 percent by weight and preferably about less than 8 percent by weight.

Typical of molybdenite concentrates are those derived from Climax, Colorado, which are derived from an oil flotation extraction process and nominally contain: molybdenum disulfide - 91.3 percent; Fe - 0.3 percent; Pb - 0.026 percent; Cu - 0.035 percent; Na - 0.0125 percent and K - 0.205 percent on an oil and moisture-free basis.

The molybdenite concentrate or other feed materials containing a high proportion of molybdenum disulfide are subjected to an oxidation step to effect a conversion of the sulfide compound to the trioxide. Of the several techniques known, roasting of the concentrate in the presence of an excess amount of oxygen is perhaps the simplest and most widely used method. The roasting operation is conventionally carried out at temperatures ranging from about 600°C. up to temperatures below that at which molybdenum oxide sublimes. Preferably, the roasting operation is carried out from about 550°C. to about 700°C.

The roaster, as schematically illustrated in the drawing, may comprise any one of the variety of commercially used multiple-hearth furnaces, including those known under the designation of Herreshoff, McDougall, Wedge, Nichols, etc. Roasters of the foregoing type comprise a plurality of annular-shaped hearths disposed in vertically spaced relationship, on which the molybdenite concentrate is transferred and passes in a cascading fashion downwardly from the uppermost hearth to the lowermost hearth while being exposed to a countercurrent flow of hot flue gases, whereby a progressive oxidation of the molybdenum disulfide occurs.

The roasted concentrate derived from the roaster consists predominantly of molybdenum oxide, of which the major portion thereof comprises the molybdenum trioxide compound. In those instances in which the feed material is of a particle size generally greater than about 200 mesh, or wherein some agglomeration of the particles occurs during the roasting operation, it is preferred to subject the roasted concentrate to a grinding or pulverizing step, such as a ball milling operation as shown in the drawing, whereby any agglomerates present are broken up to less than about 200 mesh.

The digestion of the roasted and pulverized concentrate in accordance with the first refining stage of the present process, as shown in FIG. 1, is achieved by forming a slurry containing deionized water and ammonium hydroxide present in a concentration of about 5 percent up to about 30 percent and in an amount to provide a stoichiometric ratio of ammonium to molybdate ions of at least 2:1, and preferably, a ratio in which ammonium is in excess, such as up to about 2.5:1. In accordance with one embodiment of the present invention, and as shown in the drawing, the aqueous ammonia solution is introduced during the ball milling operation and the resultant slurry is thereafter transferred to a digester (A) in which supplemental ammonia and water are added, which are recovered from other sections of the refining process along with air to effect a further oxidation of any reduced molybdenum present, as well as an oxidation of the ferrous iron present to effect a precipitation of ferric and aluminum hydroxide, which also effects a concurrent coprecipitation of other soluble contaminating constituents therein.

The digestion of the pulverized concentrate is preferably carried out at temperatures ranging from about 20°C. up to about 35°C. The digestion is carried out under vigorous agitation in which the undissolved particles are maintained in suspension. The digestion is continued for a period sufficient to effect a dissolving of substantially all of the molybdenum oxide therein and a conversion thereof to soluble ammonium molybdate compounds or complexes thereof and an oxidation and precipitation of substantially all of the iron, aluminum and other impurities present. Generally, periods of time up to about 16 hours have been found satisfactory, although longer time periods can be employed but are less desirable in view of economic considerations. The specific time period employed will vary depending on the temperature conditions, the concentration of ammonium hydroxide used, as well as the type and quantities of contaminants present in the roasted concentrate.

A purification of the slurry in the digester (A) by a coprecipitation of the ferric and aluminum constituents as hydroxides constitutes an important feature of the present invention. In order to achieve a satisfactory precipitation of such other contaminating soluble constituents, the amount of iron or aluminum or a combination thereof in the roasted concentrate feed material should be at least about 0.5 percent, and preferably from about 0.5 percent up to about 1 percent. If the iron or aluminum concentration in the roasted concentrate feed is below the foregoing minimum level, an adjustment of the iron and/or aluminum concentration can be achieved by the addition of appropriate iron or aluminum compounds, which may most conveniently be achieved at the ball milling operation. Iron and aluminum compounds suitable for addition to the roasted concentrate feed include ferric nitrate, $Fe(NO_3)$; ferric chloride, $FeCl_3$; ferric sulfate, $Fe_2(SO_4)_3$; aluminum sulfate, $Al_2(SO_4)_3$; aluminum nitrate, $Al(NO_3)_3$; as well as mixtures thereof.

At the completion of the digestion reaction, the slurry is allowed to settle and is thereafter transferred to a filter (A), whereby the clear filtrate is extracted and transferred to an evaporator crystallizer (A), as shown in the drawing, to recover high purity ammonium molybdate. The ammonium molybdate crystals are thereafter transferred to a calciner in which they are heated to an elevated temperature sufficiently high to effect a decomposition of the ammonium molybdate crystals accompanied by a liberation of ammonia which is preferably recycled back to the digester (A). The resultant calcined product comprises a high purity molybdenum trioxide typically containing, as impurities: 600 ppm K; 40 ppm Cu; 35 ppm Mg; 50 ppm Al; 70 ppm Pb; 5 ppm Fe; 200 ppm P; 190 ppm Bi, etc. Calcining temperatures which range from about 400°C. up to about 600°C. have been found particularly satisfactory in accordance with a preferred practice of the present process and require processing periods which range from as low as a fraction of an hour up to several hours to convert the ammonium molybdate compound to the corresponding molybdenum oxide product depending on the particular construction of the calciner employed and whether the process is a batch or continuous type calcining operation. Alternatively, all or a portion of the molybdenum trioxide product derived from the calciner can be transferred to the second stage refining operation for further removal of residual impurities in a manner subsequently to be described.

The filter cake derived from the filter (A) in the first stage refining operation is transferred, as shown in FIG. 1, to a leaching operation in which the residual solids are contacted with an aqueous leaching solution which may comprise either a hot nitric acid solution at a temperature of from about 50°C. to about 90°C. containing from about 5 percent up to about 30 percent and preferably about 10 percent nitric acid; or, alternatively, an aqueous solution containing about 5 percent sodium hypochlorite, NaOCl, and caustic, NaOH, in an amount sufficient to maintain the pH within a range of about 9 to about 10 during the leaching operation. The aqueous leach solution is vigorously agitated to effect a substantially complete suspension of the filter cake and is carried out for a period of time sufficient to dissolve at least a portion, and preferably substantially all, of the residual molybdenum values in the filter cake. The duration of the leaching step will vary depending upon the specific reagents employed, the concentrations used and the temperature of the aqueous leach solution. Normally, leaching cycles of as short as about 2 hours are satisfactory to extract the predominant portion of residual molybdenum values in the filter cake when using hot (90°C) aqueous solutions containing a 30 percent concentration of nitric acid under vigorous agitation. On the other hand, when using relatively dilute concentrations (10 percent) at comparatively lower temperatures (50°C), leaching durations of up to about 4 hours have been required to produce similar results.

At the conclusion of the leaching cycle, the slurry is allowed to settle and thereafter transferred to filter (B), as shown in FIG. 1 of the drawings, in which the residual cake is discarded to tailing and the filtrate is transferred to the pH adjuster to regulate the pH level of the filtrate to about 1.0. If the pH is to be lowered, then acids such as sulfuric, nitric, hydrochloric and mixtures thereof, can be employed. In the event that the pH of the filtrate is to be raised, then bases such as ammonium hydroxide, sodium hydroxide, potassium hydroxide, sodium carbonate, potassium carbonate and mixtures thereof, can be employed. The pH of filtrate must be about 1.0 to prevent precipitation of ferric hydroxide and to minimize formation of sulfites which interfere with the selective extraction of the dissolved molybdenum values in the subsequent adsorption operation or solvent extraction procedure.

After the pH adjustment has been accomplished, the filtered aqueous acid solution with or without further concentration is transferred to an adsorber containing a surface active material such as an activated char, whereby a selective adsorption of the dissolved molybdenum values is effected in accordance with the arrangement illustrated in FIG. 1. The aqueous barren liquor is discarded to waste, whereas the loaded char is transferred to a stripper unit and the adsorbed molybdenum values are stripped employing a concentrated ammonium hydroxide solution. The aqueous stripping solution containing molybdenum values in the form of ammonium molybdate is transferred to evaporator-crystallizer (A), while the stripped char is recycled or reactivated in an activator and then recycled to the adsorber for reuse.

Figure 2:
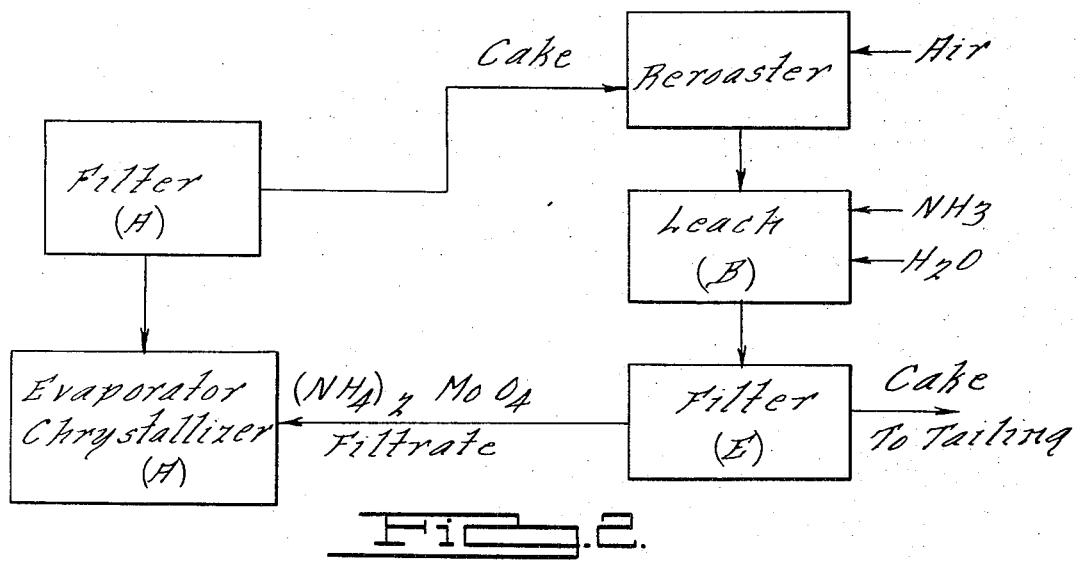
FIG. 2 is a schematic flow diagram of an alternative procedure suitable for use in the first stage refining process.

In alternative procedure for recovering the residual molybdenum values in the filter cake derived from the filter (A) is shown in the flow diagram comprising FIG. 2. As shown, the filter cake is subjected to a reroasting operation at an elevated temperature and in the presence of excess air in a manner similar to that previously described in connection with the roasting of the molybdenite concentrate. The reroasted material in which the residual molybdenum is present predominantly in the form of molybdenum trioxide is subjected to a leaching operation in a leach unit (B), to which an aqueous ammonium hydroxide solution is added, effecting a solubilizing of the molybdenum trioxide constituent by forming ammonium molybdate. The resultant leached slurry is filtered in the filter (E) and the filter cake is discarded to tailing. The filtrate containing the dissolved ammonium molybdate is directly returned to the evaporator-crystallizer (A), in which it is combined with the filtrate derived from the filter (A) for forming ammonium molybdate crystals, which subsequently are transferred to the calciner.

Figure 3:
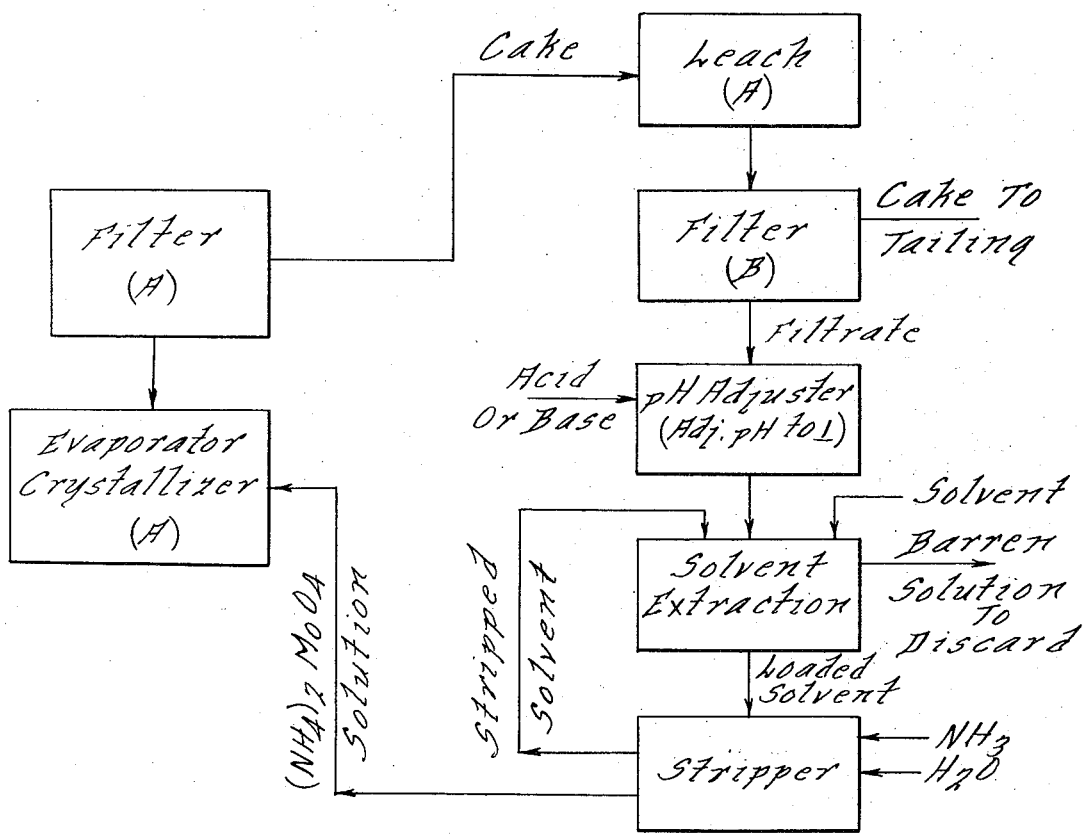
FIG. 3 is a schematic flow diagram of still another alternative procedure for use in the first stage refining process.

Still another alternative satisfactory procedure for recovering a predominant proportion of the residual molybdenum values present in the filter cake obtained from the filter (A) is illustrated in FIG. 3. As shown, the filter cake is transferred to a leaching operation in the leach unit (A), in which the molybdenum values are solubilized in the same manner as previously described in connection with the process shown in FIG. 1. The resultant slurry is filtered in filter (B) with the filter cake transferred to tailing, while the filtrate is transferred to the pH adjuster and the pH is adjusted by the addition of acids or bases as previously described to a pH of about 1. Thereafter, the filtrate is transferred to a solvent extension unit, whereby the molybdenum values are selectively extracted from the aqueous solution in a continuous or batchwise operation by contacting the solution with an organic solvent containing an active extractant therein, such as tertiary amines and quaternary ammonium compounds, forming complexes of the solubilized molybdenum constituents, rendering them aqueous insoluble and soluble in the organic phase. Typical of organic solvents suitable for use in the practice of the present process is kerosene containing controlled amounts of an active extractant, such as methyl tricaprylyl ammonium chloride, fatty amines sold under the brand name "Adogen," di(2-ethylhexyl)phosphoric acid, and the like.

The loaded organic solvent containing the complexed molybdenum values is separated from the aqueous barren solution and is transferred to a stripping unit, into which an aqueous stripping solution is discharged, effecting a decomplexing of the molybdenum complexes previously formed and a recovery of the molybdenum values therein. The aqueous stripping solution preferably contains ammonium hydroxide, whereby ammonium molybdate is formed and which is disengaged from the organic phase and directly returned to the evaporator-crystallizer (A), in which it is combined with the filtrate from the filter (A). The stripped organic solvent in turn is recycled to the solvent extraction unit for reuse.

A preferred procedure for effecting a solvent extraction stripping of molybdenum values in accordance with the arrangement schematically illustrated in FIG. 3 is described in detail in U.S. Pat. No. 3,293,004, granted Dec. 20, 1966, which is assigned to the same assignee as the present invention. Reference is made to the foregoing patent for further details of a suitable solvent stripping extraction and stripping operation for use in accordance with the practice of the present invention.

It is also contemplated in accordance with the practice of the present invention that all or a selected portion of the molybdenum trioxide product produced in the first refining stage can be transferred through a second refining stage to effect a still further purification thereof to produce a high purity ammonium molybdate product. The second stage refining step is effective to reduce the concentration of the remaining contaminating metals in the resultant ammonium molybdate product to concentrations below about 35 ppm K, 30 ppm Cu, 10 ppm Mg, 5 ppm Al, 5 ppm P and 5 ppm Bi.

The second stage refining process as shown in FIG. 1 of the drawings comprises the steps of repulping the finely particulated molybdenum trioxide product in deionized water, to which a dilute nitric acid solution is added, providing a total solids content of from about 5 percent up to about 50 percent, and preferably a solids concentration of about 10 percent by weight. An aqueous acid leaching of the molybdenum trioxide is carried out in digester (B), preferably at a temperature ranging from about room temperature up to about 80°C. and more usually around 70°C. for a period of time sufficient to effect a solubilizing of the predominant portion of the residual contaminating metals present. The concentration of nitric acid may range from as low as about 1 percent up to about 5 percent by weight. At the conclusion of the leaching operation, the slurry is permitted to settle and thereafter is transferred from the digester (B) to the filter (C) and the aqueous acid filtrate containing the solubilized contaminating cations and molybdic acid are transferred to the pH adjuster of the scavenging section of the first stage refining operation, as shown in FIGS. 1 and 3, and the molybdenum values are selectively extracted in the manner as previously described.

The filter cake, consisting predominantly of molybdenum trioxide and some residual impurities, can be washed and dried and marketed as molybdic oxide or, if the concentration level of the impurities must be reduced further, then the filter cake is transferred to the digester (C), in which the molybdenum values are again solubilized by pulping the filter cake with an aqueous ammonium hydroxide solution containing from about 5 percent up to about 30 percent ammonium hydroxide and at a temperature ranging from about room temperature (25°C.) up to boiling (100°C.), and preferably, from about 50°C. up to about 75°C. Digestion of the filter cake is carried out until substantially all of the molybdenum values therein are solubilized by conversion to the corresponding ammonium molybdate compounds, whereafter the slurry is permitted to settle and is filtered in filter (D). A portion of the filter cake can be recycled and combined with the filter cake derived from the filter (C) to scavenge any residual molybdenum values therein or, alternatively, all or a selected portion thereof can be bled to discard. The filtrate, on the other hand, derived from the filter (D) is transferred to the evaporator-crystallizer (B), whereby it is crystallized under the same conditions as previously described in connection with the evaporator-crystallizer (A) to produce ammonium molybdate crystals of extremely high purity.

In order to further illustrate the features of the refining process comprising the present invention, the following typical example is provided. It will be understood that the example is provided for illustrative purposes and is not intended to be limiting of the scope of the invention as set forth in the subjoined claims.

EXAMPLE

A sample comprising 75 grams of a roasted molybdenite concentrate was subjected to a pulverization operation to reduce the particle size thereof to an average size of less than 200 mesh. The sample is typical of concentrates derived from Climax, Colorado, containing, on an oil and moisture-free basis, 91.3 percent molybdenum disulfide, 0.3 percent Fe, 0.026 percent Pb, 0.035 percent Cu, 0.0125 percent Na and 0.205 percent K. The resultant pulverized concentrate was digested with a hot ammonium hydroxide solution comprised of 220 milliliters of deionized water and 110 milliliters of concentrated (30 percent) ammonium hydroxide solution maintained at boiling for a period of about 1 hour. In order to supplement the iron present in the roasted concentrate feed, 5 grams of ferric nitrate, $Fe(NO_3)_3$, dissolved in water was added slowly, producing a reduction in the pH of the slurry to about 6.8. Additional concentrated ammonium hydroxide solution was added to the digester to raise the pH back to about 9. The resultant digested slurry was allowed to settle and to oxidize for a period of 48 hours, whereafter the slurry was filtered and the filtrate was evaporated and crystallized. The resultant crystals were calcined at 600°C. for a period of 2 hours with an air sweep to produce a high purity molybdenum trioxide product. The filter cake on a moisture-free basis comprised 9.8 grams of the original feed material and contained only 0.985 percent molybdenum. The balance of the molybdenum comprising 99.78 percent of the original feed remained in the filtrate and was converted to the molybdenum trioxide product in the calciner.

The molybdenum trioxide product derived from the calciner was digested with a 1 percent nitric acid solution containing 10 percent solids for 16 hours at 70°C. Thereafter the digested solution was allowed to settle, filtered and washed with 1 percent nitric acid and the resultant filter cake was digested in a concentrated ammonium hydroxide solution for a period of time sufficient to effect dissolution of the molybdenum oxide constituents therein. The resultant solution was again filtered and the filtrate was evaporated and crystallized to produce a high purity ammonium molybdate product. Analyses of the ammonium molybdate crystals by spectographic and flame assays evidenced the substantially complete absence of potassium as a contaminating constituent therein.

The filter cake derived from the first ammonium hydroxide digestion of the roasted concentrate feed was treated with 50 milliliters of an aqueous solution containing 5-½ percent sodium hypochlorite, 20 milliliters of an aqueous solution containing 20 percent sodium hydroxide producing a leach solution having a pH of 10.5. The leaching was carried out for a period of 1 hour, whereafter the slurry was permitted to settle and was filtered. The filtrate contained 97.4 percent of the residual molybdenum values in the filter cake, which comprised only 0.69 percent molybdenum, providing a total recovery of molybdenum in the first stage refining process of greater than 99.9 percent.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A process for producing a high purity molybdenum product which comprises the steps of extracting a molybdenite ore to produce a concentrate consisting predominantly of molybdenum disulfide and containing iron and aluminum as contaminating metals, oxidizing said concentrate to convert substantially all of the molybdenum disulfide to molybdenum oxide, pulverizing said concentrate to reduce the particle size to less than about 200 mesh; adjusting, if necessary, the aqueous soluble iron and aluminum content of said concentrate to a level of at least about 0.5 percent; contacting the oxidized said concentrate with a first aqueous solution containing ammonium hydroxide and digesting said concentrate in the presence of free oxygen for a period of time sufficient to convert the predominant portion of the molybdenum oxide constituent therein to soluble ammonium molybdate compounds and oxidizing the contaminating ferrous iron to the ferric state effecting a precipitation thereof as ferric hydroxide together with the aluminum hydroxide present and a coprecipitation of other soluble contaminants present, separating the residual solid residue from said first aqueous ammonium hydroxide solution, contacting said residual solid residue with an aqueous leach solution and extracting the predominant portion of molybdenum values from said residual solid residue and converting the extracted molybdenum values to ammonium molybdate compounds dissolved in a second aqueous ammonium hydroxide solution, evaporating said first and second aqueous solutions to produce solid crystals of ammonium molybdate compounds, and thereafter calcining said ammonium molybdate compounds to produce a molybdenum oxide product, contacting said molybdenum oxide product with a dilute aqueous acid solution containing nitric acid for a period of time sufficient to effect a dissolution of at least some of the residual contaminating metals therein without effecting any appreciable dissolution of said molybdenum oxide content thereof, separating the digested said product from said aqueous acid solution, contacting the separated said molybdenum oxide product with a third aqueous solution containing ammonium hydroxide for a period of time sufficient to effect a dissolving of substantially all of the molybdenum oxide content thereof by a conversion to corresponding ammonium molybdate compounds, separating said third aqueous solution containing said dissolved ammonium molybdate compounds from the residual insoluble residue and thereafter evaporating said third aqueous solution and recovering crystals of a high purity ammonium molybdate product.

2. The process as defined in claim 1, wherein said residual insoluble residue separated from said third aqueous solution is recombined with the digested said product from said aqueous acid solution and subjected to further contact with said third aqueous solution containing ammonium hydroxide to effect a further dissolving of any residual molybdenum oxide values therein.

3. A process for producing a high purity molybdenum product which comprises the steps of extracting a molybdenite ore to produce a concentrate consisting predominantly of molybdenum disulfide and containing iron and aluminum as contaminating metals, oxidizing said concentrate to convert substantially all of the molybdenum disulfide to molybdenum oxide, pulverizing said concentrate to reduce the particle size to less than about 200 mesh, adjusting, if necessary, the aqueous soluble iron and aluminum content of said concentrate to a level of at least about 0.5 percent; contacting the oxidized said concentrate with a first aqueous solution containing ammonium hydroxide and digesting said concentrate in the presence of free oxygen for a period of time sufficient to convert the predominant portion of the molybdenum oxide constituent therein to soluble ammonium molybdate compounds and oxidizing the contaminating ferrous iron to the ferric state effecting a precipitation thereof as ferric hydroxide together with the aluminum hydroxide present and a coprecipitation of other soluble contaminants present, separating the residual solid residue from said first aqueous ammonium hydroxide solution, leaching said residual solid residue with a hot aqueous acid leach solution at a temperature of about 50°C to about 90°C containing from about 5 percent to about 30 percent nitric acid for a period of time sufficient to dissolve substantially all of the molybdenum values therein, separating the aqueous acid leach solution from the remaining solid residue, adjusting the pH of said aqueous acid leach solution to a level of about 1, contacting said aqueous acid leach solution with a surface active material for a period of time sufficient to selectively adsorb the predominant portion of solubilized molybdenum values therein, separating the loaded said surface active material from the barren said aqueous acid leach solution, stripping the loaded said surface active material to recover the molybdenum values thereon in the form of ammonium molybdate compounds dissolved in a second aqueous ammonium hydroxide solution, evaporating said first and second aqueous solutions to produce solid crystals of ammonium molybdate compounds, and thereafter calcining said ammonium molybdate compounds to produce a high purity molybdenum oxide product.

4. The process as defined in claim 3, wherein the concentration of nitric acid in said aqueous acid leach solution is about 10 percent.

5. A process for producing a high purity molybdenum product which comprises the steps of extracting a molybdenite ore to produce a concentrate consisting predominantly of molybdenum disulfide and containing iron and aluminum as contaminating metals, oxidizing said concentrate to convert substantially all of the molybdenum disulfide to molybdenum oxide, pulverizing said concentrate to reduce the particle size to less than about 200 mesh; adjusting, if necessary, the aqueous soluble iron and aluminum content of said concentrate to a level of at least about 0.5 percent; contacting the oxidized said concentrate with a first aqueous solution containing ammonium hydroxide and digesting said concentrate in the presence of free oxygen for a period of time sufficient to convert the predominant portion of the molybdenum oxide constituent therein to soluble ammonium molybdate compounds and oxidizing the contaminating ferrous iron to the ferric state effecting a precipitation thereof as ferric hydroxide together with the aluminum hydroxide present and a coprecipitation of other soluble contaminants present, separating the residual solid residue from said first aqueous ammonium hydroxide solution, leaching said residual solid residue with an aqueous alkaline leach solution containing sodium hypochlorite and caustic in an amount sufficient to maintain the pH thereof within a range of about 9 to about 10 for a period of time sufficient to dissolve substantially all of the molybdenum values in the residue, separating the aqueous alkaline leach solution from the remaining solid residue, adjusting the pH of said aqueous alkaline leach solution to about 1 by the addition of acid, contacting the adjusted said aqueous leach solution with a surface active material for a period of time sufficient to selectively adsorb the predominant portion of solubilized molybdenum values therein, separating the loaded said surface active material from the barren said aqueous leach solution, and stripping the loaded said surface active material to recover the molybdenum values thereon in the form of ammonium molybdate compounds dissolved in a second aqueous ammonium hydroxide solution, evaporating said first and second aqueous solutions to produce solid crystals of ammonium molybdate compounds, and thereafter calcining said ammonium molybdate compounds to produce a high purity molybdenum oxide product.

6. A process for producing a high purity molybdenum product which comprises the steps of extracting a molybdenite ore to produce a concentrate consisting predominantly of molybdenum disulfide and containing iron and aluminum as contaminating metals, oxidizing said concentrate to convert substantially all of the molybdenum disulfide to molybdenum oxide, pulverizing said concentrate to reduce the particle size to less than about 200 mesh; adjusting, if necessary, the aqueous soluble iron and aluminum content of said concentrate to a level of at least about 0.5 percent; contacting the oxidized said concentrate with a first aqueous solution containing ammonium hydroxide and digesting said concentrate in the presence of free oxygen for a period of time sufficient to convert the predominant portion of the molybdenum oxide constituent therein to soluble ammonium molybdate compounds and oxidizing the contaminating ferrous iron to the ferric state effecting a precipitation thereof as ferric hydroxide together with the aluminum hydroxide present and a coprecipitation of other soluble contaminants present, separating the residual solid residue from said first aqueous ammonium hydroxide solution, leaching said residual solid residue with an aqueous acid leach solution containing from about 5 percent to about 30 percent nitric acid for a period of time sufficient to dissolve substantially all of the molybdenum values therein, separating the aqueous acid leach solution from the remaining solid residue, adjusting the pH of said aqueous acid leach solution to about 1, contacting the adjusted said aqueous acid leach solution with an organic solvent containing a complexing agent therein for a period of time sufficient to extract the predominant portion of molybdenum values from said aqueous acid leach solution, separating the loaded said organic solvent from the barren said aqueous acid leach solution, stripping the loaded said organic solvent to recover the molybdenum values therefrom in the form of ammonium molybdate compounds dissolved in a second aqueous ammonium hydroxide solution, evaporating said first and second aqueous solutions to produce solid crystals of ammonium molybdate compounds, and thereafter calcining said ammonium molybdate compounds to produce a high purity molybdenum oxide product.

7. A process for producing a high purity molybdenum product which comprises the steps of extracting a molybdenite ore to produce a concentrate consisting predominantly of molybdenum disulfide and containing iron and aluminum as contaminating metals, oxidizing said concentrate to convert substantially all of the molybdenum disulfide to molybdenum oxide, pulverizing said concentrate to reduce the particle size to less than about 200 mesh, adjusting if necessary, the aqueous soluble iron and aluminum content of said concentrate to a level of at least about 0.5 percent; contacting the oxidized said concentrate with a first aqueous solution containing ammonium hydroxide and digesting said concentrate in the presence of free oxygen for a period of time sufficient to convert the predominant portion of the molybdenum oxide constituent therein to soluble ammonium molybdate compounds and oxidizing the contaminating ferrous iron to the ferric state effecting a precipitation thereof as ferric hydroxide together with the aluminum hydroxide present and a coprecipitation of other soluble contaminants present, separating the residual solid residue from said first aqueous ammonium hydroxide solution, leaching said residual solid residue with an aqueous alkaline leach solution containing sodium hypochlorite and caustic in an amount sufficient to maintain the pH thereof within a range of about 9 to about 10 for a period of time sufficient to dissolve substantially all of the molybdenum values therein, separating the aqueous alkaline leach solution from the remaining solid residue, adjusting the pH of said aqueous alkaline leach solution to about 1, contacting the adjusted said leach solution with an organic solvent containing a complexing agent for a period of time sufficient to selectively extract the predominant portion of molybdenum values therein, separating the loaded said organic solvent from the barren said leach solution, stripping the loaded said organic solvent with said second aqueous ammonium hydroxide solution to recover the molybdenum values therein in the form of ammonium molybdate compounds dissolved in a second aqueous ammonium hydroxide solution, evaporating said first and second aqueous solutions to produce solid crystals of ammonium molybdate compounds, and thereafter calcining said ammonium molybdate compounds to produce a high purity molybdenum oxide product.

* * * * *